United States Patent Office 2,759,900
Patented Aug. 21, 1956

2,759,900

TEXTILE COATING COMPOSITIONS CONTAINING POLYACRYLATES WITH CARBOXYALKYL ETHERS

John R. Caldwell and Russell Gilkey, Kingsport, Tenn., assignors to Eastman Kodak Company, Rochester, N. Y., a corporation of New Jersey No Drawing. Application December 23, 1954,
Serial No. 477,390

19 Claims. (Cl. 260—17)

This invention concerns the preparation of polymeric compositions, more particularly compositions comprising polyacrylates polymerized in the presence of hydroxyalkyl or carboxyalkyl cellulose ethers.

Various polymerization compositions have been prepared from acrylic acid and acrylic acid esters along with other polymerizable materials and the like such as those disclosed in U. S. 2,140,048 to Fikentscher et al. However, when many of these polymerizable compositions have been used as sheets, films or as coatings on textile fibers, the resultant material has been vapor tight as well as waterproof, and there has been a need for textile coatings for rain wear which would provide a waterproof coating, but which would enable water vapor to pass through the fabric. At the same time it is desirable that the textile coating be resistant to solvents ordinarily used in dry cleaning as well as resistant to soaps and detergents, so that the rain wear would not require a subsequent recoating after each dry cleaning.

An object of this invention is to provide a method of preparing a polymeric composition comprising acrylic acid esters polymerized with carboxyalkyl cellulose ethers. Another object of this invention is to provide transparent, flexible sheets and films that have a high capacity to transmit water vapor and are resistant to transmission of liquid water. A further object of this invention is to provide a coated or impregnated textile fabric or leather that has a high transmission rate for water vapor but will not allow the penetration of liquid water. A still further object of this invention is to furnish a transparent, flexible coating for paper from a viscous water emulsion.

The objects of this invention are accomplished by polymerizing acrylic acid esters in the presence of hydroxyalkyl or carboxyalkyl cellulose ethers dissolved in water. The aqueous emulsions or dopes so obtained can be coated or cast to give films. These films are permeable to water vapor but are impermeable to liquid water, and this property is retained when the emulsions are applied to a large variety of textile fabrics or leather. In addition, the emulsions can be extruded through suitable spinnerets to make fibers. They can also be coated on paper to give a tough flexible backing.

An important feature of these products produced according to this invention is their property of retaining a high degree of flexibility under all conditions of use and, at the same time, retaining the same property of transmitting water vapor, which is a difficult characteristic to obtain in a single material. For example, it is known that films of polyvinyl alcohol can be plasticized to give flexibility and cross linked to give water insolubility. Such films transmit water vapor. However, when they come in contact with liquid water or aqueous solutions, the plasticizer is leached from the film and a brittle, inflexible product is obtained when the film is dried. In contrast to this, the present invention provides a film containing carboxyalkyl or hydroxyalkyl cellulose ethers that remain flexible even after prolonged contact with hot water. The polyacrylate resin functions as a permanent water soluble plasticizer under all conditions of ordinary use.

It is preferred in this invention to use 20–60% of a carboxyalkyl or hydroxyalkyl cellulose ether which is dissolved in water and in which has been dispersed an acrylic acid ester. Hydroxyethyl cellulose, which is representative of the hydroxyalkyl celluloses, becomes water soluble with a degree of substitution of 1.4 or higher. The carboxyalkyl celluloses, carboxymethyl cellulose for example, are used as the alkali metal or ammonium salts. A low degree of substitution is sufficient to render them water soluble. The acrylic esters used in the process are derived from straight and branched chain alcohols containing from 1 to 6 carbon atoms. Suitable esters are those derived from the following alcohols; methyl, ethyl, propyl, n-butyl, isobutyl, sec-butyl, n-amyl, isoamyl, cyclohexyl, and the like. Interpolymers of acrylic esters with other vinyl monomers such as methacrylamide, isopropyl acrylamide, methacrylates, vinyl acetate, vinyl chloride, acrylonitrile, methacrylonitrile, styrene, and the like may be used. Interpolymers should contain at least 50 mole percent acrylic ester.

The polymeric compositions may contain from 20–75% carboxyalkyl or hydroxyalkyl cellulose ether while the preferred range is from 30–60%.

The polymerization is carried out in aqueous dispersion. The desired hydroxyalkyl or carboxyalkyl cellulose ether is dissolved in water to give a solution of 5–30% concentration. Up to 50% isopropyl alcohol may be added to improve the solubility of those cellulose ethers difficultly soluble in water. The acrylate monomer is added to the cellulose ether solution. Emulsifying agents such as sodium salts of sulfated fatty alcohols, soaps, aromatic sulfonates and the like can be used but are not absolutely necessary. The more reactive acrylate monomers should be added in several portions. In order to obtain resistance to organic solvents, it is desired to cross link the acrylate resins. This can be done during the polymerization by addition of 0.5–5% and preferably 1.0–3.0% of divinyl compound such as divinyl benzene, allyl acrylate, allyl phthalate and the like.

Water-soluble catalysts such as sodium persulfate, potassium persulfate, hydrogen peroxide, and the like are preferred, and a promoter such as sodium sulfite or sodium bisulfite can be added to speed up the polymerization. The promoter is essential in polymerization involving cellulose ethers having inverse solubility characteristics. The preferred range of promoter is 0.1–1%, based on the weight of monomers. From 0.05% to 3.0% and preferably 0.5% to 1% catalyst is used, based on the weight of monomers. The mixture is agitated at a temperature of 30° C. to 120° C. depending on the combination of cellulose ether and acrylate monomer being used. The reaction is completed in 3 to 12 hours.

The final product is a smooth, viscous emulsion or cream that contains no lumps or irregularities. In order to obtain films, fibers, and the like that are resistant to immersion in water, it is necessary to add a hardening or cross-linking agent for the cellulose ether. In general, any of the known hardening agents for cellulose derivatives may be used. Suitable examples include formaldehyde, trimethylol nitromethane, methylol ureas, methylol melamines, zirconium salts, polybasic acids and the like. From 1% to 15% and preferably 2% to 10% cross-linking agent is used based on the weight of cellulose ether present in the emulsion. At this stage the emulsion is ready to be coated, extruded or used for dipping, as desired. Evaporation of the emulsion leaves a clear, flexible, tough film. It can be coated on fabrics, paper and leather by the usual methods employing rolls and doctor blades. From 10 to 50% and preferably 20–30% resin is added to the material to be coated upon a dry weight basis. The coated article is then dried at 100–120° C.

If it is desired, a fire-retarding agent such as tricresyl phosphate, triphenyl phosphate, chloroethyl phosphate, and the like may be incorporated in the resin film.

Fibers may be spun from the dispersion by extrusion through a multi-hole spinneret into a coagulating bath of sodium sulfate or other salt. Alternatively, a dry spinning process can be used wherein the dope is extruded downward through a spinneret into a heated atmosphere that evaporates the water.

The following examples are intended to illustrate the invention but not to limit its scope:

*Example I*

One hundred grams of the ammonium salt of carboxymethylcellulose was dissolved in 1000 cc. water and the following materials were added:

300 g. ethyl acrylate
3 g. allyl acrylate
3 g. ammonium persulfate

The mixture was stirred at 55–65° C. for 8 hours. A smooth, viscous emulsion was obtained. Five grams melamine resin and 5 grams trimethylol nitromethane were added to cross link the carboxymethyl cellulose.

Nylon sharkskin fabric was padded with the emulsion to give an increase in weight of 15–20% on a dry basis, and the coated cloth was dried at 110–120° C.

The coated fabric showed a water vapor transmission of 50–60% of the water vapor transmission of the untreated fabric, and held a hydrostatic head of 5 feet of water.

*Example II*

One hundred grams of the sodium salt of carboxymethyl cellulose was dissolved in 1000 cc. of water and the following materials were added.

250 g. butyl acrylate
1 g. divinylbenzene
3 g. potassium persulfate
2 g. sodium dodecyl sulfate The mixture was stirred at 55–60° C. for 8 hours to give a smooth, viscous emulsion. Five grams of trimethylol melamine and one gram of ammonium phosphate were added and the emulsion was coated on cotton airplane cloth to give a dry weight addition of 1.5 ounces per yard. The coated cloth was dried at 110° C.

The coated fabric showed a water vapor transmission of 60–70% of that of the untreated fabric, and held a hydrostatic head of 5 feet of water.

Garments made from the coated fabric had high resistance to penetration by acidic vapors such as sulfur dioxide, HCl, HBr, phosgene, phosphorus trichloride, chlorine, and bromine.

*Example III*

One hundred grams of the potassium salt of carboxyethylcellulose was dissolved in water and the following materials were added:

300.0 g. isobutyl acrylate
100.0 g. vinyl acetate
6.0 g. sulfonated mineral oil
4.0 g. sodium persulfate
3.0 g. sodium bisulfite The mixture was stirred at 60–70° C. for 6 hours. Ten grams of melamine formaldehyde resin was added.

This emulsion was coated on textile fabrics to give products that showed a high transmission rate for water vapor. At the same time, the coated fabrics were effective barriers for acidic gases, as listed in Example II above. The emulsion was also useful for coating leather.

The carboxylated cellulose derivatives possess an important advantage over the cellulose alkyl ethers because metallic salts can be formed. These metallic salts are important for increasing the resistance of the films towards toxic chemicals and gases, and especially acids. For example the sodium salt of carboxymethylcellulose will react with sulfuric acid, hydrochloric acid and the like to give the sodium salt which is harmless. Furthermore, the alkaline earth metal salts of carboxy cellulose derivatives will react with a wide variety of other toxic agents such as chlorine, bromine, phosgene, sulfuryl chloride, thionyl chloride, phosphorus oxychloride, acetyl chloride, acetic anhydride, sulfur trioxide, and the like. By using this principle, fabrics can be treated by the process of this invention to give protection against many toxic agents. These fabrics have an important advantage over previously known protecting garments because they will transmit water vapor.

*Example IV*

One hundred grams of $\beta$-hydroxyethyl cellulose was dissolved in 900 cc. of water and the following materials were added:

120.0 g. butyl acrylate
30.0 g. acrylonitrile
3.0 g. diallyl phthalate
2.0 g. sodium persulfate
1.0 g. sodium bisulfite
2.0 g. sodium dodecyl sulfate The mixture was stirred at 55–60° C. for 8 hours. Six grams of urea-formaldehyde resin was added.

The emulsion was coated on textile fabrics to give products that showed a high transmission rate for water vapor but were impervious to liquid water.

*Example V*

One hundred grams of $\beta$-hydroxyethyl cellulose was dissolved in 1500 cc. of water and the following materials were added:

300 g. methyl acrylate
100 g. octyl acrylate
8 g. sodium octadecyl sulfate
5 g. potassium persulfate
5 g. sodium bisulfite
10 g. divinylbenzene The mixture was stirred at 60–65° C. for 8 hours to give a smooth, viscous emulsion. Five grams of trimethylol melamine and one gram of ammonium phosphate were added. The emulsion was coated on cotton sheeting to give a dry weight addition of 1.8 ounces per square yard and the coated cloth was dried at 110–120° C. The fabric showed a water vapor transmission of 60–70% of that of the untreated fabric, and held a hydrostatic head of 5 feet of water.

*Example VI*

One hundred grams of the sodium salt of carboxymethyl cellulose was dissolved in 1200 cc. of water and the following materials were added:

160 g. butyl acrylate
40 g. N-isopropylacrylamide
2 g. divinylbenzene
4 g. sulfonated mineral oil
2 g. sodium persulfate
2 g. sodium bisulfite The mixture was stirred at 50–60° C. for 8 hours. Five grams of formaldehyde and two grams of ammonium chloride were added, and the emulsion was coated on a cotton fabric to give three ounces per square yard, on a dry basis. The fabric is valuable for the manufacture of clothing that gives protection against acidic vapors. The coated fabric will not allow the passage of liquid water but it is highly permeable to water vapor.

Various mixtures of polymeric materials with cellulose derivatives have been used as coating materials but these mixtures are not polymerization products but rather are mixtures of polymeric substances such as polymerized polyacrylates mixed with a cellulose derivative. These compositions can be used in sizes and as water soluble finishing agents. However, they are not cross-linked in order to give water insolubility and the resistance to water is not as great as that of the products produced according to this invention. Moreover, mixtures give cloudy weak films whereas the polymers made according to this invention give clear strong films.

The special properties of the films obtained by this invention make them valuable for the following uses: substitutes for leather in shoe uppers, raincoats, and other types of wet-weather apparel, tents, clothing that is resistant to toxic gases and other purposes where the transmission of water vapor is desired. The products of the invention may also be converted into strong elastic fibers that show a high capacity for moisture and dye absorption. The products may also be used as water base paint and as a dipping lacquer. They are also valuable in coating paper to give a tough flexible backing.

We claim:

1. A polymeric composition comprising an aliphatic acrylate in which the alkyl radical contains 1–6 carbon atoms, polymerized in an aqueous solution of 0.5–5.0% by weight, based on the weight of the acrylate monomer, of a cross-linking agent selected from the class consisting of divinyl benzene, allyl acrylate and allyl phthalate, and 20–75% by weight, based on the polymeric composition, of a cellulose ether selected from the class of alkali metal salts of carboxyalkyl cellulose, ammonium carboxyalkyl cellulose, and hydroxyalkyl cellulose in which the alkyl group contains 1–3 carbon atoms, 0.1–1% by weight of an alkali metal salt of sulfurous acid based on the weight of the acrylate monomer, in which the cellulosic component is cross-linked by the addition to the polymerization mixture of 1–15% by weight of a hardening agent for cellulose derivatives, based on the weight of the cellulose ether, selected from the class consisting of formaldehyde, trimethylol nitromethane, methylol-urea, zirconium salts, and trimethylol melamine.

2. A polymeric composition comprising an aliphatic acrylate in which the alkyl radical contains 1–6 carbon atoms polymerized in an aqueous solution of 0.5–5% by weight, based on the weight of the acrylate monomer, of a cross-linking agent selected from the class consisting of divinyl benzene, allyl acrylate and allyl phthalate, 0.1–1.0% by weight, based on the weight of the acrylate monomer, of an alkali metal salt of sulfurous acid and 20–75% by weight, based on the polymeric composition, of an alkali metal salt of carboxymethyl cellulose in which the cellulosic component is cross-linked by the addition to the polymerization mixture of 1–15% by weight, based on the weight of the cellulose ether, of a hardening agent for cellulose derivatives selected from the class consisting of formaldehyde, trimethylol nitromethane, methylol-urea, zirconium salts, and trimethylol melamine.

3. A polymeric composition comprising an aliphatic acrylate in which the alkyl radical contains 1–6 carbon atoms polymerized in an aqueous solution of 0.5–5% by weight, based on the weight of the acrylate monomer, of a cross-linking agent selected from the class consisting of divinyl benzene, allyl acrylate and allyl phthalate, 0.1–1.0% by weight, based on the weight of the acrylate monomer, of an alkali metal salt of sulfurous acid and 20–75% by weight, based on the weight of the total polymeric composition, of hydroxyethyl cellulose and in which the cellulosic component is cross-linked by the addition to the polymerization mixture of 1–15% by weight, based on the weight of the cellulose ether, of a hardening agent for cellulose derivatives selected from the class consisting of formaldehyde, trimethylol nitromethane, methylol-urea, zirconium salts and trimethylol melamine.

4. A polymeric composition comprising an aliphatic acrylate in which the alkyl radical contains 1–6 carbon atoms polymerized in an aqueous solution of 0.5–5.0% by weight, based on the weight of the acrylate monomer, of a cross-linking agent selected from the class consisting of divinyl benzene, allyl acrylate and allyl phthalate, 0.1–1.0% by weight, based on the weight of the acrylate monomer, of an alkali metal salt of sulfurous acid and 20–75% by weight, based on the weight of the total polymeric composition, of hydroxymethyl cellulose and in which the cellulosic component is cross-linked by the addition to the polymerization mixture of 1–15% by weight, based on the weight of the cellulose ether, of a hardening agent for cellulose derivatives selected from the class consisting of formaldehyde, trimethylol nitromethane, methylol-urea, zirconium salts, and trimethylol melamine.

5. A polymeric composition comprising an aliphatic acrylate in which the alkyl radical contains 1–6 carbon atoms polymerized in an aqueous solution of 0.5–5% by weight, based on the weight of the acrylate monomer, of a cross-linking agent selected from the class consisting of divinyl benzene, allyl acrylate and allyl phthalate, 0.1–1.0% by weight, based on the weight of the acrylate monomer, of an alkali metal salt of sulfurous acid, and an alkali metal salt of 20–75% by weight, based on the total weight of the polymeric composition, of carboxyethyl cellulose and in which the cellulosic component is cross-linked by the addition to the polymerization mixture of 1–15% by weight, based on the weight of the cellulose ether, of a hardening agent for cellulose derivatives selected from the class consisting of formaldehyde, trimethylol nitromethane, methylol-urea, zirconium salts, and trimethylol melamine.

6. A polymeric composition comprising an aliphatic acrylate in which the alkyl radical contains 1–6 carbon atoms polymerized in an aqueous solution of 0.5–5.0% by weight, based on the weight of the acrylate monomer, of a cross-linking agent selected from the class consisting of divinyl benzene, allyl acrylate and allyl phthalate, 0.1–1.0% by weight, based on the weight of the acrylate monomer, of an alkali metal salt of sulfurous acid and 20–75% by weight, based on the total weight of the polymeric composition, of a cellulose ether selected from the class consisting of alkali metal salts of carboxyalkyl cellulose, ammonium carboxyalkyl cellulose and hydroxyalkyl cellulose in which the alkyl group contains 1–3 carbon atoms and in which the cellulosic component is cross-linked by the addition to the polymerization mixture of 1–15% by weight of a hardening agent for cellulose derivatives, based on the weight of the cellulose ether, selected from the class consisting of formaldehyde, trimethylol nitromethane, methylol-urea, zirconium salts and trimethylol melamine.

7. A textile material coated with a polymeric composition comprising an aliphatic acrylate in which the alkyl radical contains 1–6 carbon atoms polymerized in an aqueous solution of 0.5–5.0% by weight, based on the weight of the acrylate monomer, of a cross-linking agent selected from the class consisting of divinyl benzene, allyl acrylate and allyl phthalate, 0.1–1.0% by weight, based on the weight of the acrylate monomer, of an alkali metal salt of sulfurous acid, and 20–75% by weight, based on the weight of the total polymeric composition, of a cellulose ether selected from the class consisting of alkali metal salts of carboxyalkyl cellulose, ammonium carboxyalkyl cellulose and hydroxyalkyl cellulose in which the alkyl group contains 1–3 carbon atoms, and in which the cellulosic component is cross-linked by the addition to the polymerization mixture of 1–15% by weight, based on the weight of the cellulose ether, of a hardening agent for cellulose derivatives selected from the class consisting of formaldehyde, trimethylol nitromethane, methylol-urea, zirconium salts, and trimethylol melamine.

8. A polymeric composition comprising an aliphatic acrylate in which the alkyl radical contains 1–6 carbon atoms polymerized in an aqueous solution of 0.5–5.0% by weight, based on the acrylate monomer, of a cross-linking agent selected from the class consisting of divinyl benzene, allyl acrylate and allyl phthalate, 0.1–1.0% by weight, based on the weight of the acrylate monomer, of an alkali metal salt of sulfurous acid, and 20–75% by weight, based on the weight of the total polymeric composition, of a cellulose ether selected from the class consisting of alkali metal salts of carboxyalkyl cellulose, ammonium carboxyalkyl cellulose and hydroxyalkyl cellulose in which the alkyl group contains from 1–3 carbon atoms dissolved in water containing 1–15% by weight, based on the weight of the cellulose ether, of trimethylol melamine and ammonium phosphate as a cross-linking agent for the cellulosic component.

9. A process for the formation of a polymeric composition comprising polymerizing an aliphatic acrylate in which the alkyl radical contains 1–6 carbon atoms in an aqueous solution containing 0.5–5% by weight, based on the acrylate monomer, of a cross-linking agent selected from the class consisting of divinyl benzene, allyl acrylate and allyl phthalate, 0.1–1.0% by weight, based on the weight of acrylate monomer, of an alkyl metal salt of sulfurous acid and 20–75% by weight, based on the weight of the total polymeric composition, of a cellulose ether selected from the class consisting of the alkali metal salts of carboxyalkyl cellulose, ammonium carboxyalkyl cellulose and hydroxyalkyl cellulose in which the alkyl group contains 1–3 carbon atoms and adding to the polymerization mixture 1–15% by weight, based on the weight of the cellulose ether, of a hardening agent for cellulose derivatives selected from the class consisting of formaldehyde, trimethylol nitromethane, methylol-urea, zirconium salts, and trimethylol melamine.

10. A process for the preparation of a polymeric composition comprising polymerizing an aliphatic acrylate in which the alkyl radical contains 1–6 carbon atoms in an aqueous solution containing 0.5–5.0% by weight, based on the acrylate monomer, of a cross-linking agent selected from the class consisting of divinyl benzene, allyl acrylate and allyl phthalate, 0.1–1.0% by weight, based on the weight of the acrylate monomer, of an alkali metal salt of sulfurous acid and from 20–75% by weight, based on the weight of the total polymeric composition, of an alkali metal salt of carboxyethyl cellulose dissolved in water containing 1–15% by weight of a hardening agent for cellulose derivatives, based on the weight of the cellulose ether, selected from the class consisting of formaldehyde, trimethylol nitromethane, methylol-urea, zirconium salts, and trimethylol melamine.

11. A process for the preparation of a polymeric compositon comprising dissolving 20–75% by weight, based on the weight of the total polymeric composition, of an alkali metal salt of carboxymethyl cellulose in water to give a solution of 5–30% concentration, adding an aliphatic acrylate monomer in which the alkyl radical contains 1–6 carbon atoms, adding a cross-linking agent having 0.5–5% by weight, based on the weight of the acrylate monomer, selected from the class consisting of divinyl benzene, allyl acrylate and allyl phthalate, adding 0.1–1.0% by weight, based on the weight of the acrylate monomer, of an alkali metal salt of sulfurous acid, polymerizing the mixture by heating at a temperature of from 50–70°C. and adding 1–15% by weight, based on the weight of the cellulose ether, of a hardening agent for cellulose derivatives selected from the class consisting of formaldehyde, trimethylol nitromethane, methylol-urea, zirconium salts and trimethylol melamine.

12. A process for the preparation of a polymeric composition comprising dissolving 20–75% by weight, based on the weight of the total polymeric composition, of an alkali metal salt of carboxymethyl cellulose in water to give a solution of 5–30% concentration, adding an aliphatic acrylate monomer in which the alkyl radical contains 1–6 carbon atoms, adding 0.5–5.0% by weight, based on the acrylate monomer, of allyl acrylate, 0.1–1.0% by weight, based on the weight of the acrylate monomer, of an alkali metal salt of sulfurous acid, and from .05–3.0% by weight, based on the acrylate monomer, of ammonium persulfate, polymerizing the mixture by heating at a temperature of from 55–65°C. and adding from 1–15% by weight, based on the weight of the cellulose ether, of trimethylol nitromethane.

13. A process for the preparation of a polymeric composition comprising dissolving 20–75% by weight, based on the weight of the total polymeric composition, of an alkali metal salt of carboxymethyl cellulose in water to give a solution of 5–30% concentration, adding an aliphatic acrylate monomer in which the alkyl group contains 1–6 carbon atoms, adding from 0.5–5% by weight, based on the acrylate monomer, of divinyl benzene, 0.1–1.0% by weight, based on the weight of the acrylate monomer, of an alkali metal salt of sulfurous acid, and from .05–3.0% by weight, based on the acrylate monomer, of potassium persulfate, polymerizing the mixture by heating at a temperature of from 50–70° C. and cross-linking by adding 1–15% by weight, based on the weight of cellulose ether, of a hardening agent for cellulose derivatives selected from the class consisting of formaldehyde, trimethylol nitromethane, methylol-urea, zirconium salts, and trimethylol melamine.

14. A process for the preparation of a polymeric composition comprising dissolving 20–75% by weight, based on the weight of the total polymeric composition, of an alkali metal salt of carboxyethyl cellulose in water to give a solution of 5–30% concentration, adding an aliphatic acrylate monomer having an alkyl group containing 1–6 carbon atoms, and vinyl acetate so that at least 50% of the vinyl monomers is the acrylate 0.5–5% by weight based on the acrylate monomer, of divinyl benzene, .05–3.0% sodium persulfate and 0.1–1.0% by weight of an alkali metal salt of sulfurous acid, based on the weight of the combined vinyl monomers, polymerizing the mixture by heating at a temperature of from 50–70°C. and cross-linking by adding to the polymerization mixture 1–15% by weight, based on the weight of the carboxyethyl cellulose salt, of a material selected from the class consisting of formaldehyde, trimethylol nitromethane, methylol-urea, zirconium salts and trimethylol melamine.

15. A process for coating textile fabric comprising coating the composition prepared according to claim 14 on a textile fabric and drying at a temperature of about 100–120° C.

16. A process for the preparation of a polymeric composition comprising dissolving 20–75% by weight, based on the weight of the total polymeric composition, of hydroxymethyl cellulose in water to give a solution of 5–30% concentration, adding an aliphatic acrylate monomer in which the alkyl group contains 1–6 carbon atoms, adding 0.5–5% by weight of divinyl benzene, based on the weight of the acrylate monomer, 0.1–1.0% by weight, based on the weight of the acrylate monomer, of an alkali metal salt of sulfurous acid, and 0.05–3% by weight, based on the weight of the acrylate monomer, and a water-soluble catalyst selected from the class consisting of sodium persulfate, potassium persulfate and hydrogen peroxide, polymerizing the mixture by heating at a temperature of from 50–70° C., and cross-linking the cellulosic component by adding 1–15% by weight, based on the weight of the cellulosic component, of a material selected from the class consisting of formaldehyde, trimethylol nitromethane, methylol-urea, zirconium salts and trimethylol melamine.

17. A process for the preparation of a polymeric composition comprising dissolving 20–70% by weight, based on the weight of the total polymeric composition, of hydroxyethyl cellulose in water to give a solution of 5–30% concentration, adding an aliphatic acrylate monomer in which the alkyl radical contains 1–6 carbon atoms, adding 0.5–5% by weight of divinyl benzene, based on the weight of the acrylate monomer, 0.1–1.0% by weight, based on the weight of the acrylate monomer, of an alkali metal salt of sulfurous acid, and 0.05–3% by weight, based on the weight of the acrylate monomer, of a water-soluble catalyst selected from the class consisting of sodium persulfate, potassium persulfate and hydrogen peroxide, polymerizing the mixture by heating at a temperature of from 50–70° C. and cross linking the cellulosic component by adding 1–15% by weight, based on the weight of the cellulosic component of a material selected from the class consisting of formaldehyde, trimethylol nitromethane, methylol-urea, zirconium salts and trimethylol melamine.

18. A process for the preparation of a polymeric composition comprising dissolving 20–75% by weight, based on the weight of the total polymeric composition, of hydroxypropyl cellulose in water to give a solution of 5–30% concentration, adding an aliphatic acrylate monomer in which the alkyl group contains 1–6 carbon atoms, adding 0.5–5% by weight of divinyl benzene, based on the weight of the acrylate monomer, 0.1–1.0% by weight, based on the weight of the acrylate monomer, of an alkali metal salt of sulfurous acid, and 0.05–3% by weight, based on the weight of the acrylate monomer, of a water-soluble catalyst selected from the class consisting of sodium persulfate, potassium persulfate, and hydrogen peroxide, polymerizing the mixture by heating at a temperature of from 50–70° C. and cross-linking the cellulosic component by adding a material selected from the class consisting of formaldehyde, trimethylol nitromethane, methylol-urea, zirconium salts and trimethylol melamine in an amount of 1–15% by weight, based on the weight of the hydroxypropyl cellulose.

19. A process for the preparation of a polymeric composition comprising dissolving in an aqueous solution 20–75% by weight, based on the weight of the total polymeric composition, of a cellulose ether selected from the class consisting of alkali metal salts of carboxyalkyl cellulose, ammonium carboxyalkyl cellulose, and hydroxyalkyl cellulose in which the alkyl group contains 1–3 carbon atoms, adding an aliphatic acrylate monomer in which the alkyl group contains 1–6 carbon atoms, adding another vinyl monomer selected from the class consisting of methacrylamide, isopropyl acrylamide, aliphatic methacrylamides in which the alkyl group contains 1–6 carbon atoms, vinyl acetate, vinyl chloride, acrylonitrile, methacrylonitrile, and styrene, the molar ratio of acrylate ester to the other vinyl monomer being at least 50–50, adding 0.05–3% by weight, based on the weight of the acrylate monomer, of a water-soluble catalyst selected from the class consisting of sodium persulfate, potassium persulfate and hydrogen peroxide, 0.5–5.0% by weight, based on the weight of the combined vinyl monomers, of a cross-linking agent selected from the class consisting of divinyl benzene, allyl acrylate and allyl phthalate, and 0.1–1.0% by weight, based on the weight of the combined vinyl monomers, of an alkali metal salt of sulfurous acid, polymerizing the mixture by heating, and cross-linking the cellulosic component by adding 1–15% by weight, based on the weight of the cellulose ether, of a material selected from the class consisting of formaldehyde, trimethylol nitromethane, methylol-urea, zirconium salts, and trimethylol melamine.

References Cited in the file of this patent

UNITED STATES PATENTS 2,155,590     Garvey _____ Apr. 25, 1939